United States Patent [19]
Gershen

[11] Patent Number: 6,011,326
[45] Date of Patent: Jan. 4, 2000

[54] DUAL SWITCH AND/OR DIMMER SYSTEM ILLUMINATED WITH SINGLE NEON LAMP

[75] Inventor: Bernard Gershen, Centerport, N.Y.

[73] Assignee: Leviton Manufacturing Co., Inc., Little Neck, N.Y.

[21] Appl. No.: 08/893,942

[22] Filed: Jul. 15, 1997

Related U.S. Application Data

[63] Continuation-in-part of application No. 08/680,664, Jul. 16, 1996, abandoned.

[51] Int. Cl.[7] .................................................. F21V 33/00
[52] U.S. Cl. .......................... 307/125; 307/30; 200/310; 362/95; 439/490
[58] Field of Search .................... 307/125, 113, 307/24, 29, 30; 362/95, 84; 315/291, 362; 200/310; 439/490

[56] References Cited

U.S. PATENT DOCUMENTS

| | | | |
|---|---|---|---|
| 3,718,835 | 2/1973 | Stoughton | 315/83 |
| 3,864,561 | 2/1975 | Spira et al. | 362/95 |
| 3,898,516 | 8/1975 | Nakasone | 315/194 |
| 4,888,494 | 12/1989 | McNair et al. | 307/38 |
| 4,968,897 | 11/1990 | Murray | 307/113 |
| 5,319,283 | 6/1994 | Elwell | 315/362 |
| 5,660,459 | 8/1997 | Appelberg | 200/310 |

*Primary Examiner*—Albert W. Paladini
*Attorney, Agent, or Firm*—Paul J. Sutton

[57] ABSTRACT

A dual lighting control device with a single illuminator includes a line terminal for electrical connection to a source of AC electrical power, first and second electrical switching devices including line and load ends and setable to either an open or closed state and are electrically connected at line ends to the lien terminal. The illuminator, which may comprise a neon lamp, includes first and second terminals and is electrically connected at its first terminal to the line terminal. First and second electrical loads are electrically connectable, respectively, to the load side of the first and second switching devices. First and second diodes are electrically connected between the second terminal of the neon lamp and load ends of the first and second switching devices, respectively. The illuminator is activated when both switching devices are set to the open state or when one of the switching devices is open and the other is closed. The illuminator is off when both switching devices are set to the open state. Dimmer controls can be inserted in series with the switching devices to permit varying the brightness level of the electrical loads and the illuminator itself.

19 Claims, 6 Drawing Sheets

DUAL SWITCH AND/OR DIMMER SYSTEM ILLUMINATED WITH SINGLE NEON LAMP

This application is a continuation in part of U.S. patent application Ser. No. 08/680,664 filed Jul. 16, 1996, now abandoned.

FIELD OF THE INVENTION

The present invention relates generally to electrical lighting control devices and more particularly relates to an illuminated dual lighting switching device having a single illuminator.

BACKGROUND OF THE INVENTION

Electrical wall switches and dimmer switches are known in the art which include illumination means, such as a neon lamp 16, for illuminating the switch while the load to be controlled, such as a lighting fixture is off, i.e., drawing minimal power. Dual switches are known for separately controlling the power delivered to each of two electrical loads to be controlled. Dual switches may comprise common on/off switches (e.g., SPST), hereinafter referred to interchangeably as switching devices, or more complex devices which include dimmer mechanisms or the like. Particular dual switches are known to include a separate neon lamp 16 or illumination means for each switching device within the switch. When one of the two switching devices is on and the other is off, the neon lamp 16 associated with the switching device that is off is illuminated, enhancing a person's ability to identify the location of the electrical wall switch in a darkened room. The neon lamp 16 associated with the switching device that is on, i.e., in the closed state, remains off.

Figure 1A:
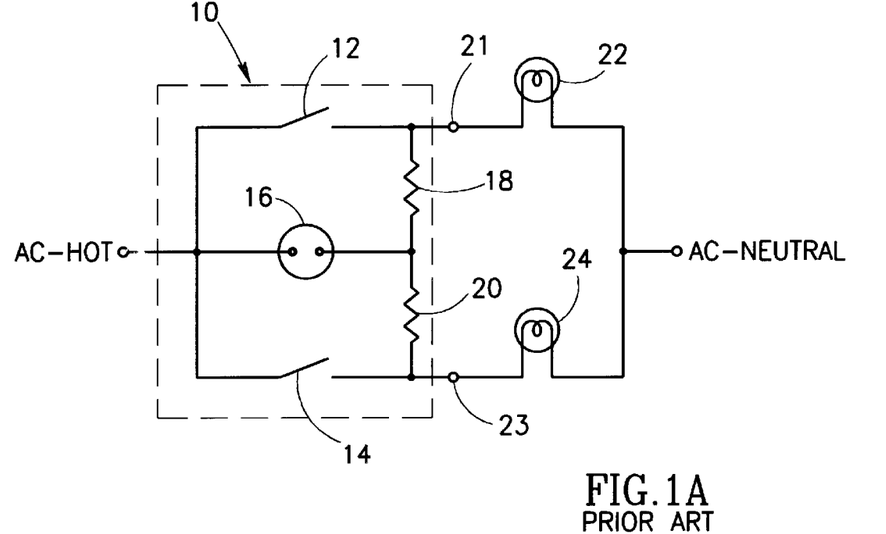
FIG. 1A is a schematic diagram illustrating a dual switch single illuminator circuit of the prior art with both switches in the open position.

Also known are dual electrical switches which include two switching devices and a single illumination means, e.g., a single neon lamp, for illuminating the dual switch when both switching devices are set to their off state. A schematic diagram illustrating a dual switch single illuminator circuit of the prior art with both switches in the open position is shown in FIG. 1A. The prior art circuit shown in FIG. 1A depicts a simple, dual switch on/off type lamp control circuit 10. The circuit comprises a single neon lamp 16 and two switching devices 12, 14 which separately control power to lamps 22, 24. Switching devices 12, 14 are electrically connectable at line ends to a phase line of an AC source (not shown) via the dual switch line terminal labeled AC-HOT. Terminal AC-HOT is also electrically connected to a first end of neon lamp 16. Second end of neon lamp 16 is electrically connected to the load end of switching device 12 and the line end of lamp 22 through a first resistor 18. Similarly, the second end of neon lamp 16 is electrically connected to a load end of switching device 14 and a line end of lamp 24 through a second resistor 20. Return ends of lamps 22, 24 are electrically connectable to a neutral terminal of the AC source via the terminal labeled AC-NEUTRAL.

Figure 1B:
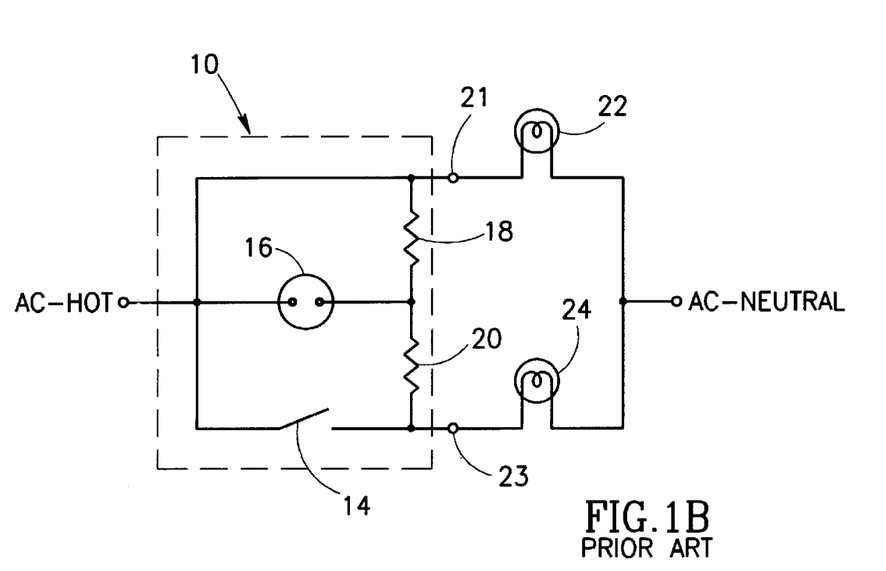
FIG. 1B is a schematic diagram illustrating a dual switch single illuminator circuit of the prior art with one switch in the closed position.

A schematic diagram illustrating a dual switch single illuminator circuit of the prior art with one switch in the closed position is shown in FIG. 1B. With reference to FIGS. 1A and 1B, operation of the dual switch circuit 10 will now be described. When both switching devices 12, 14 are set to an off or non-conductive state, whereby power to lamps 22, 24 is reduced, and the break-over voltage in the range of 60 to 80 volts appears across neon lamp 16 and a parallel combination of two series circuits. The first series circuit is composed of resistor 18 and lamp 22 and the second series circuit is composed of resistor 20 and lamp 24 and the lamp 16 glows at full brightness. Note that the current supplied to lamps 22 and 24 from neon lamp 16 is not sufficient to make their filaments glow. If either of switching devices 12, 14 is switched to the on or conductive state, whereby power is delivered to one of the lamps, circuit of FIG. 1A can be redrawn as shown in FIG. 1B. In FIG. 1B, switch 12 is shown closed but the operation is identical if switch 14 is closed instead.

With switch 12 closed, there now exists a voltage divider comprising resistors 18, 20. Note that the resistance of lamp 24 is small compared to the resistance of the two resistors. Therefore, the voltage across the neon lamp 16 can reasonably be approximated to be one half the AC supply voltage or about 60 V. Assuming that a typical neon lamp 16 requires approximately 80 volts to light, the 60 V is below the striking potential, i.e., insufficient to light the neon lamp 16, and the neon lamp 16 is effectively an open circuit. Note that the currents and voltages are the same for both positive and negative half cycles of the AC voltage.

The neon lamp 16 remains off until that time at which both switching devices are again set to an off state, again establishing a current path through the neon lamp 16. Similarly, when both switching devices 12, 14 are set to an on state, the neon lamp 16 will not be energized.

Note that the above description assumes an AC input voltage of 120 V such as in use in the United States. If the same circuit of FIG. 1A is utilized in a country with a higher AC voltage, e.g., 220 V provided in most European countries, the neon lamp 16 would light. In this case, the current flowing through the neon lamp 16 is reduced with one switch closed compared with the current when both switches are open. The current is reduced because the current through the resistor 20 splits between the neon lamp 16 and resistor 18. Whereas with the switch 12 open, the current to the neon lamp 16 is supplied from resistors 18, 20 essentially in parallel.

While it is advantageous to use only one lamp in the dual-switch circuit because, for example, reduced manufacturing and operational cost (i.e., power consumption), a disadvantage is that the neon lamp 16 is effectively an open circuit and does not light when one of the switching devices is set to a conductive, i.e., on, state. For example, in a case where the two electrical loads controlled by the two switching devices are located in different rooms, both the neon lamp 16 and one of the two controlled loads could possibly be located in a room which is darkened, while the other load is energized elsewhere. Because the neon lamp 16 would not be illuminated, the light switch location in the darkened room would therefore be rendered difficult to identify.

SUMMARY OF THE INVENTION

It is therefore an object of the present invention to provide a dual lighting control device which overcomes the shortcomings of the prior art.

It is another object of the present invention to provide a dual lighting control device within which a single illuminator device may be effectively and efficiently used for identifying the dual switch location in a darkened room.

It is another object of the present invention to provide a dual switching device where a single illuminator device included in the switching device remains activated even though one of two switching devices included therein is set to the off state.

It is still another object of the present invention to provide a dual dimming device where a single illuminator device included in the dual dimming device is lit unless both dimmer controllers are set to approximately maximum brightness level.

Accordingly, a dual lighting control device which includes two switching devices and a single illuminator such as a neon lamp 16 is provided wherein the illuminator may be lit at approximately half brightness when either of the switching devices is set to an off or non-conductive state. The device includes first and second load terminal connectors to which line sides of first and second loads are electrically connected. Return end sides of the loads are electrically connected to a neutral terminal of the AC source. The load terminal connectors are also electrically connected to load sides of each of the switching devices, respectively. A neon lamp 16 is electrically connected at a first end to a phase terminal of the system and at its second end to each of the first load terminal connector and the load side of the first switching device via a first diode and first resistor combination. Similarly, the neon lamp 16 is electrically connected at its second end to the second load terminal connector and the load side of the second switching device via a second diode and second resistor combination. Accordingly, while one switching device is in an on or conductive state, a return path exists through the neon lamp 16 via the other diode and resistor combination during the negative half cycle of the AC source.

In another embodiment, first and second dimmer controls are electronically interposed between the load sides of the first and second switching devices, respectively, and the first and second load terminal connectors, respectively. First and second diodes are included, in series connection to, respectively, first and second resistors. In such an arrangement, when one of the switching devices is set to the on state, the brightness of the neon lamp 16 is controlled by the point in the AC cycle the dimmer triac fires. If the triac fires before the amplitude of the AC voltage reaches 80 volts, the neon lamp 16 is not activated.

BRIEF DESCRIPTION OF THE DRAWINGS

The invention is herein described, by way of example only, with reference to the accompanying drawings, wherein.

DETAILED DESCRIPTION OF THE INVENTION

The dual lighting control device with single illuminator of the present invention, hereinafter referred to interchangeably as the device or circuit, provides a lighting control device that is capable of controlling two electrical loads while utilizing a single illuminator for both loads. The dual lighting control device may comprise two switching controls or two dimming controls. The illuminator included in the device is not lit when both switches are on or when both dimmer controls are operating at substantially maximum brightness levels. An advantage of such a lighting control device is that only one neon lamp 16 is needed to illuminate the location of the lighting control device itself. An additional advantage is that the illuminator will be lit when either of the switching controls is non conductive, i.e., off, so that if one of the electrical loads, e.g., lamps, controlled by the lighting control device is located at a remote distance from the lighting control device, the illuminator still lights, enabling a user, such as a homeowner, to quickly locate the light control device in the dark.

Figure 2A:
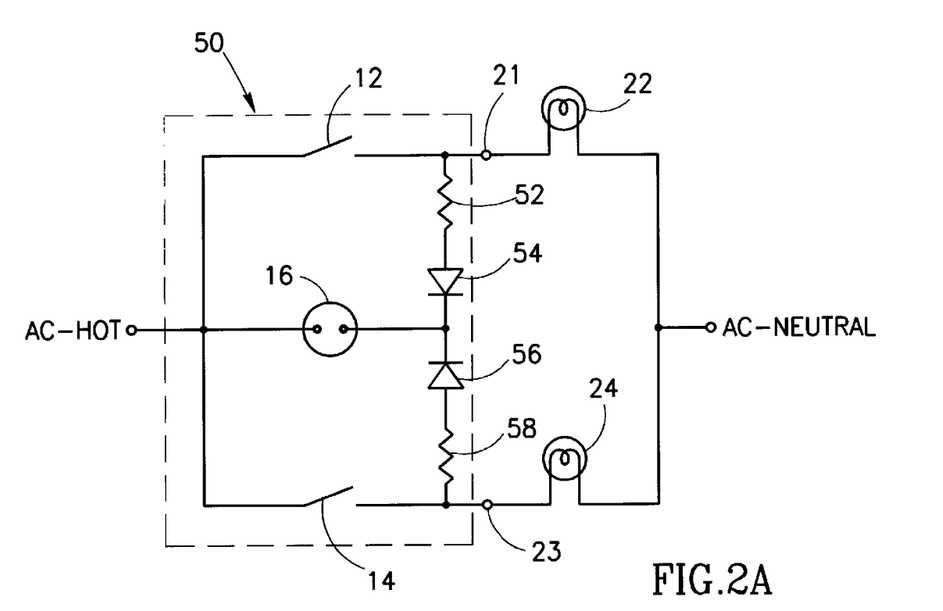
FIG. 2A is a schematic diagram illustrating a first embodiment of a dual switch single illuminator circuit with both switches in the open position constructed in accordance with the present invention.

A schematic diagram illustrating a first embodiment of a dual switch single illuminator circuit with both switches in the open position constructed in accordance with the present invention is shown in FIG. 2A. The first embodiment of the present invention includes a circuit, generally referenced 50, which comprises a neon lamp 16, switches 12, 14, resistors 52, 58 and diodes 54, 56. In addition, a pair of load terminal connectors 21, 23 are shown electrically connected to line ends of lighting fixtures 22, 24, respectively. A neon lamp 16 suitable for use with the present invention is lamp model number A1C, manufactured by Chicago Miniature Lamp Corp., Buffalo Grove, Ill. This particular neon lamp 16 requires approximately 70 to 80 volts to actuate the lamp. The line side of the switches 12, 14 and the neon lamp 16 are connected to the phase line of a source of AC electrical power, labeled AC-HOT in FIG. 2A. Return ends of lighting fixtures 22, 24 are each electrically connected to a terminal labeled AC-NEUTRAL which is electrically connected to the neutral of the AC source. Load end of switching device 12 is electrically connected to terminal 21 and to a second end of neon lamp 16 through resistor 52 and diode 54. Similarly, load end of switching device 14 is electrically connected to terminal 23 and to a second end of neon lamp 16 through resistor 58 and diode 56.

With reference to FIG. 2A, with both switches 12, 14 open, current flows through the neon lamp 16 only during the negative half cycle where the AC-NEUTRAL terminal is positive with respect to the AC-HOT terminal. In addition, current flows through both branches whereby current is supplied by both resistors 52, 58.

Figure 2B:
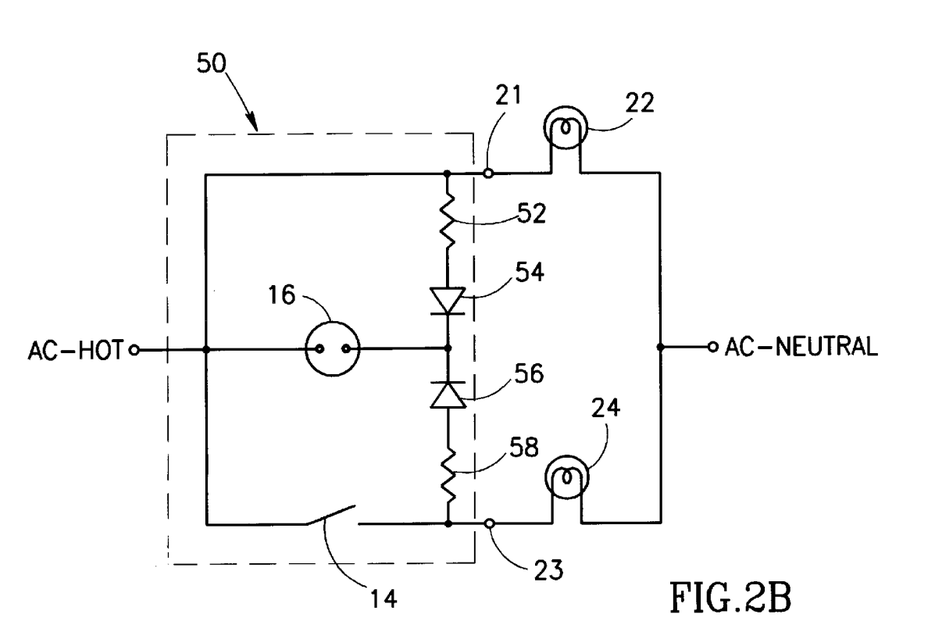
FIG. 2B is a schematic diagram illustrating a first embodiment of a dual switch single illuminator circuit with one switch in the closed position.

The operation of the circuit for the case where one of the switches, e.g., switch 12, is closed will now be described. A schematic diagram illustrating the first embodiment of a dual switch single illuminator circuit with one switch in the closed position is shown in FIG. 2B. With such an arrangement, the branch comprising resistor 52 and diode 54 does not carry any current during both positive and negative half cycles of the AC voltage. Note that the diodes 54, 56 are arranged in series opposing each other. Thus, during the negative half cycle, i.e., the AC-NEUTRAL terminal is positive with respect to the AC-HOT terminal, current for the neon lamp 16 will flow through resistor 58 and diode 56 only. This causes the brightness for the neon lamp 16 to be lower than when both switches are in the open state.

Diode 54 functions to block any current flow during the negative half cycle of the AC voltage. The current that flows through resistor 58 and diode 56 drives the neon lamp 16. Without the diode 54, resistors 52, 58 form a voltage divider with insufficient voltage to light the neon lamp 16, as in circuit 10 of the prior art.

Figure 3A:
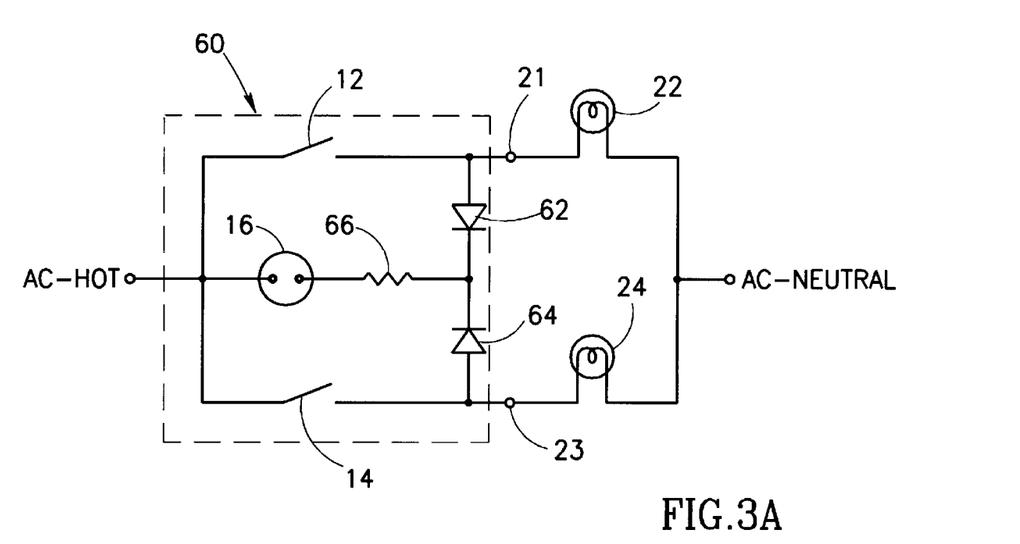
FIG. 3A is a schematic diagram illustrating a second embodiment of a dual switch single illuminator circuit with both switches in the open position constructed in accordance with the present invention.

A schematic diagram illustrating a second embodiment of a dual switch single illuminator circuit with both switches in the open position constructed in accordance with the present invention is shown in FIG. 3A. The circuit of FIG. 3A, generally referenced as 60, comprises a neon lamp 16, switches 12, 14, resistor 66 and diodes 62, 64. As in the first embodiment, the line side of the switches 12, 14 and the neon lamp 16 are connected to the phase line of a source of AC electrical power, labeled AC-HOT. Return ends of lighting fixtures 22, 24 are each electrically connected to a terminal labeled AC-NEUTRAL which is electrically connected to the neutral of the AC source. Load end of switching device 12 is electrically connected to terminal 21 and to the second end of resistor 66 through diode 62. Similarly, load end of switching device 14 is electrically connected to terminal 23 and to the second end of resistor 66 through diode 64. The first end of the resistor 66 is electrically connected to the neon lamp 16. Compared to circuit 50 of FIGS. 2A and 2B, resistors 52, 58 are replaced by a single resistor 66 in circuit 60. Accordingly, any current flowing through either of diodes 62, 64 to light the neon lamp 16 will flow through resistor 66.

Figure 3B:
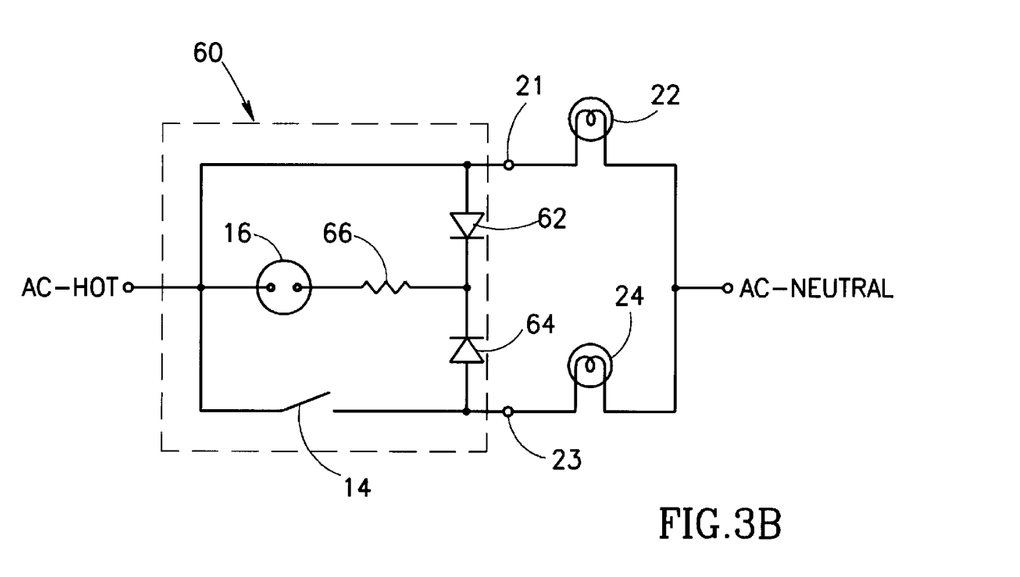
FIG. 3B is a schematic diagram illustrating a second embodiment of a dual switch single illuminator circuit with one switch in the closed position.

A schematic diagram illustrating a second embodiment of a dual switch single illuminator circuit with one switch in the closed position is shown in FIG. 3B. The operation of the circuit 60 in FIGS. 3A and 3B is similar to that of the circuit 50 described in connection with FIGS. 2A and 2B. The difference being that only one resistor is required rather than two. With switch 12 closed, current to the neon lamp 16 comes from diode 64 during the negative half cycle of the AC voltage while diode 62 oppose any current flow. Similarly, with switch 14 closed, current to the neon lamp 16 comes from diode 62 during the negative half cycle of the AC voltage while diode 64 opposes any current flow.

Another difference between the circuit of FIGS. 3A and 3B and FIGS. 2A and 2B is that the brightness of the neon lamp 16 in circuit 60 is the same for either both switches open or one switch open and one switch closed. This is due to replacing the two resistors 52, 58 in circuit 50 with a single resistor 66 in circuit 60. Note that in both circuits 50 and 60, the neon lamp 16 does not light when both switches 12, 14 are closed.

Figure 4A:
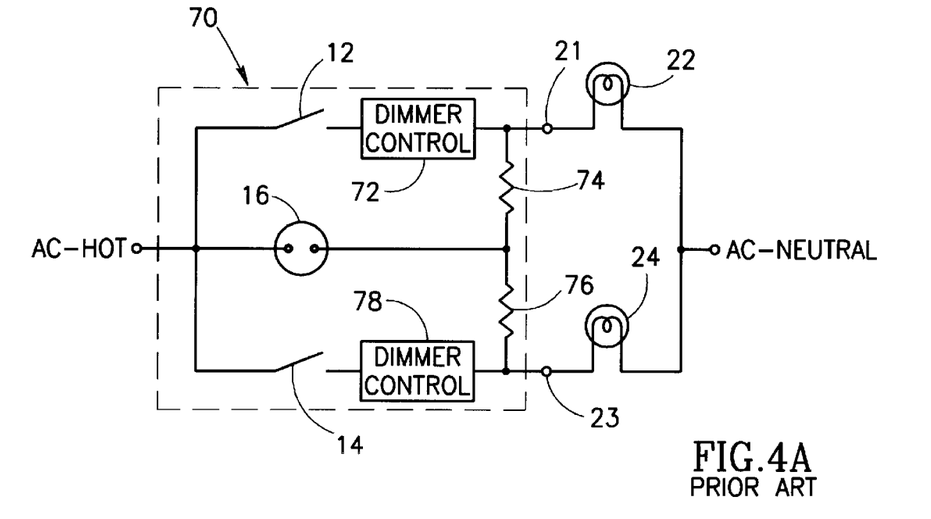
FIG. 4A is a schematic diagram illustrating a dual dimmer control single illuminator circuit of the prior art with switch in the open position.

A schematic diagram illustrating a dual dimmer control single illuminator circuit of the prior art with both dimmer controls in the open position is shown in FIG. 4A. The circuit, generally referenced as 70, comprises a single neon lamp 16 and two switches 12, 14 associated with two dimmer controls 72, 78, respectively. Switch 12 is in series with dimmer control 72 and switch 14 is in series with dimmer control 78. Dimmer controls 72, 78 function to control the amplitude of the voltage to the electrical loads 22, 24, respectively. The electrical load is typically a lighting device of some type. Switching devices 12, 14 are electrically connectable at line ends to a phase line of an AC source (not shown) via the terminal labeled AC-HOT. Terminal AC-HOT is also electrically connected to a first end of neon lamp 16. Second end of neon lamp 16 is electrically connected to the load end of dimming control 72 and the line end of lamp 22 through a first resistor 74. Similarly, the second end of neon lamp 16 is electrically connected to a load end of dimming control 78 and a line end of lamp 24 through a second resistor 76. Return ends of lamps 22, 24 are electrically connectable to a neutral terminal of the AC source via the terminal labeled AC-NEUTRAL.

Figure 4B:
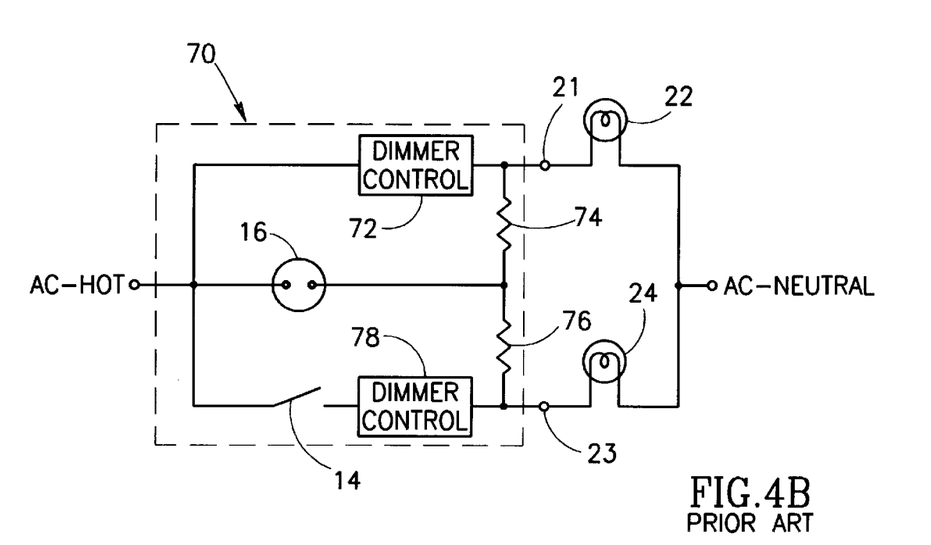
FIG. 4B is a schematic diagram illustrating a dual dimmer control single illuminator circuit of the prior art with one switch in the closed position.

A schematic diagram illustrating a dual dimmer control with single illuminator circuit of the prior art with one switch in the closed position is shown in FIG. 4B. With reference to FIGS. 4A and 4B, operation of the dual dimmer control circuit, generally referenced as 70, will now be described. When both switching devices 12, 14 are in the open or non conductive state, whereby power to lamps 22, 24 is cut off, full AC voltage is applied to the neon lamp 16 through resistors 74, 76 during both positive and negative half cycles of the AC voltage. If either of switching devices 12, 14 is switched to the closed or conductive state, whereby power is delivered to one of the lamps, the circuit of FIG. 4A can be redrawn as shown in FIG. 4B. In FIG. 4B, switch 12 is shown closed but the operation is identical if switch 14 is closed instead.

In general, the case using dimmer controls in series with switches 12,14 is similar to that of switches 12,14 alone. In the case of dimmer controls, however, a continuum of neon lamp 16 brightness levels exists with the brightness level dependent on the dimmer brightness level. When switch 12 is closed, there now exists a voltage divider comprising resistors 74, 76. Note that the resistance of lamp 24 is small compared to the resistance of the two resistors and thus can be neglected. The voltage across the neon lamp 16 depends on the dimming level set by the dimmer control 72. At full brightness level, the voltage across the neon lamp 16 is approximately one half the AC supply voltage or about 60 V. Assuming a typical neon lamp 16 requires approximately 80 volts to light, the 60 V is below the striking potential, i.e., insufficient to light the neon lamp 16, and the neon lamp 16 is effectively an open circuit. On the other hand, if the dimmer control 72 is set to a low brightness level, the voltage across the neon lamp 16 is high enough to light the neon lamp 16. Thus, the brightness of the neon lamp 16 is dependent on the dimming level of the dimmer control. Note that the currents and voltages are the same for both positive and negative half cycles of the AC voltage.

In circuit 70, when one of the two switching devices is set to the closed state, the neon lamp 16 will light only if the triac within the dimmer control associated with a particular switch turns on late enough in the AC cycle. If the triac turns on too early in the AC cycle the neon lamp 16 will not light. When the triac fires early in the AC cycle, the neon lamp 16 is off regardless of the state of the switch 14 and the dimming level of its associated dimmer control.

Figure 5A:
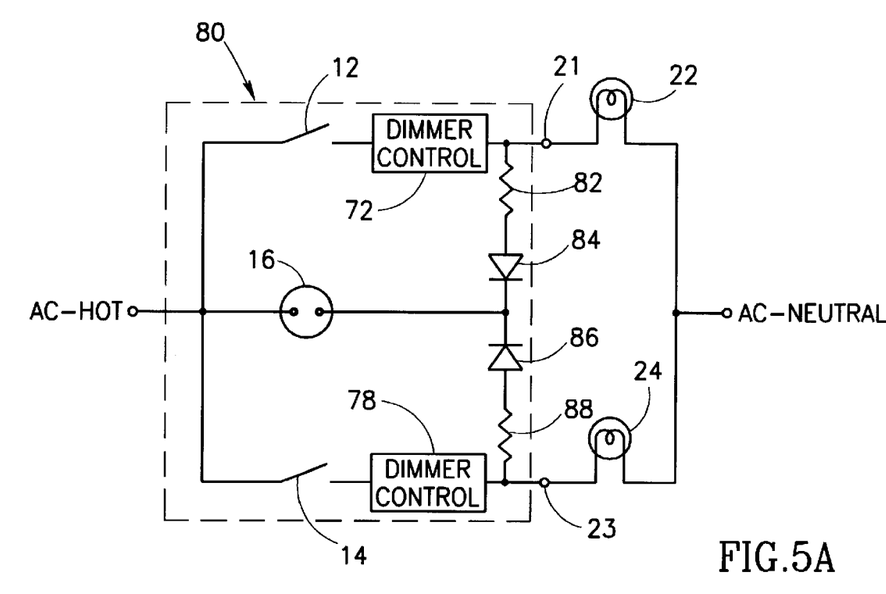
FIG. 5A is a schematic diagram illustrating a third embodiment of a dual dimmer control single illuminator circuit with both switches in the open position constructed in accordance with the present invention.

A third embodiment is presented herein that overcomes the limitation of the prior art circuit 70 of FIG. 4A. A schematic diagram illustrating a third embodiment of a dual dimmer control with single illuminator circuit constructed in accordance with the present invention whereby both switches are in the open position is shown in FIG. 5A. The circuit, generally referenced as 80, is similar to the circuit 50 of FIG. 2A with the exception that circuit 80 includes dimmer controls 72, 78. The circuit 80 comprises a neon lamp 16, switches 12, 14, dimmer controls 72, 74, resistors 82, 88 and diodes 84, 86. In addition, a pair of load terminal connectors 21, 23 are shown electrically connected to line ends of lighting fixtures 22, 24, respectively. The line side of the switches 12, 14 and the neon lamp 16 are connected to the phase line of a source of AC electrical power, labeled AC-HOT in FIG. 5A. The second end of neon lamp 16 is electrically connected to the load end of dimming control 72 and the line end of lamp 22 through resistor 82 and diode 84. Similarly, the second end of neon lamp 16 is electrically connected to a load end of dimming control 78 and a line end of lamp 24 through resistor 88 and diode 86. Return ends of lighting fixtures 22, 24 are each electrically connected to a terminal labeled AC-NEUTRAL which is electrically connected to the neutral of the AC source.

Figure 5B:
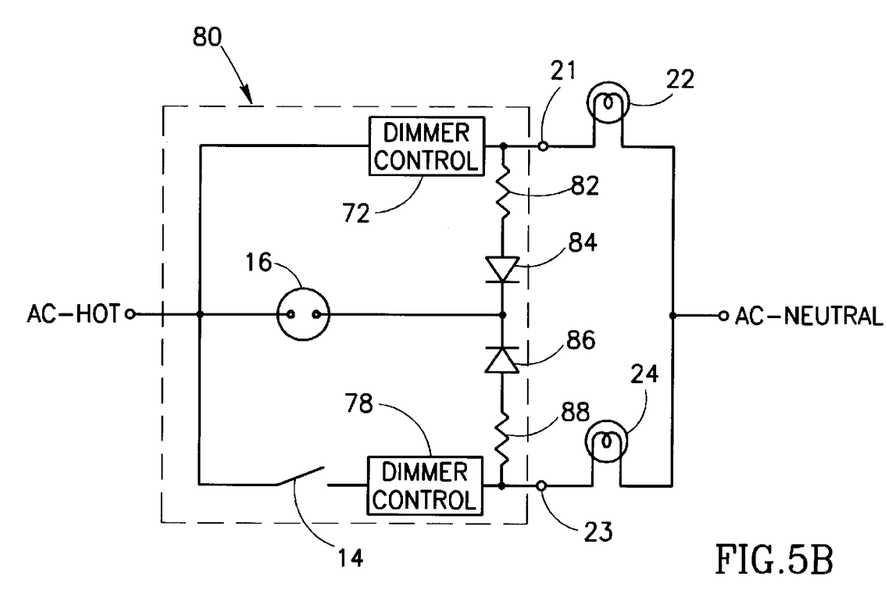
FIG. 5B is a schematic diagram illustrating a third embodiment of a dual dimmer control single illuminator circuit with one switch in the closed position.

When both switching devices 12, 14 are in the open state, the neon lamp 16 is lit during every negative half cycle of the AC voltage. In the case where one switching device, i.e., 12, is in the closed state, however, the neon lamp 16 remains lit. A schematic diagram illustrating a third embodiment of a dual dimmer control single illuminator circuit with one switch in the closed position is shown in FIG. 5B. The brightness level of the neon lamp 16 varies in this case with the brightness level of the dimmer control 72. This is due to the resistors 82, 88. When both switches are open, both branches contribute current to light the neon lamp 16. When switch 12 is closed, the dimmer control 72 may be set to a brightness level such that current flows through resistor 82 and diode 84 during the negative half cycle of the AC voltage.

If the switch 14 is also closed, then the brightness level of the neon lamp 16 also depends on the brightness level of the dimmer control 78. Even if both switches are in the closed state, the neon lamp 16 may still light if the dimmer controls 72, 78 are set to a low enough brightness level. The neon lamp 16 will not light when both switches are closed if the brightness level of both dimmer controls 72,78 are set too high, i.e., both dimmer controls 72,78 fire too early in the AC cycle. Accordingly, the brightness of the neon light 16 varies with the firing angle of both triacs within the dimmer controls 72,78 when both switches 12, 14 are closed.

Figure 6A:
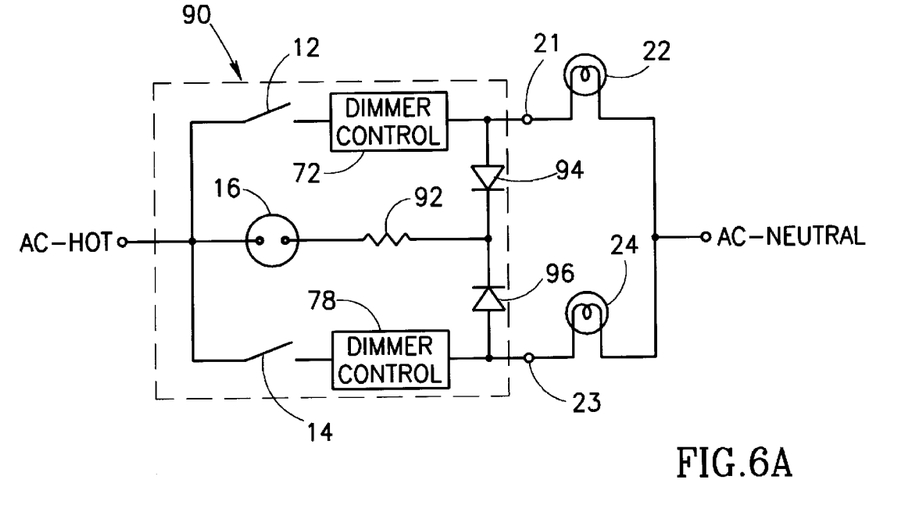
FIG. 6A is a schematic diagram illustrating a fourth embodiment of a dual dimmer control single illuminator circuit with both switches in the open position constructed in accordance with the present invention.

A schematic diagram illustrating a fourth embodiment of a dual dimmer control single illuminator circuit with both switches in the open position constructed in accordance with the present invention is shown in FIG. 6A. The circuit, generally referenced as 90, is similar to the second embodiment of circuit 60 shown in FIG. 3A. Resistors 82, 88 in circuit 80 have been replaced by a single resistor 92. Resistor 92 comprises a first and a second end, the first end of which is connected to the second end of neon lamp 16, and the second end of which is connected to the cathode ends of diodes 94, 96. Accordingly, current flowing through either of diodes 94, 96 to power neon lamp 16 passes through resistor 92.

Figure 6B:
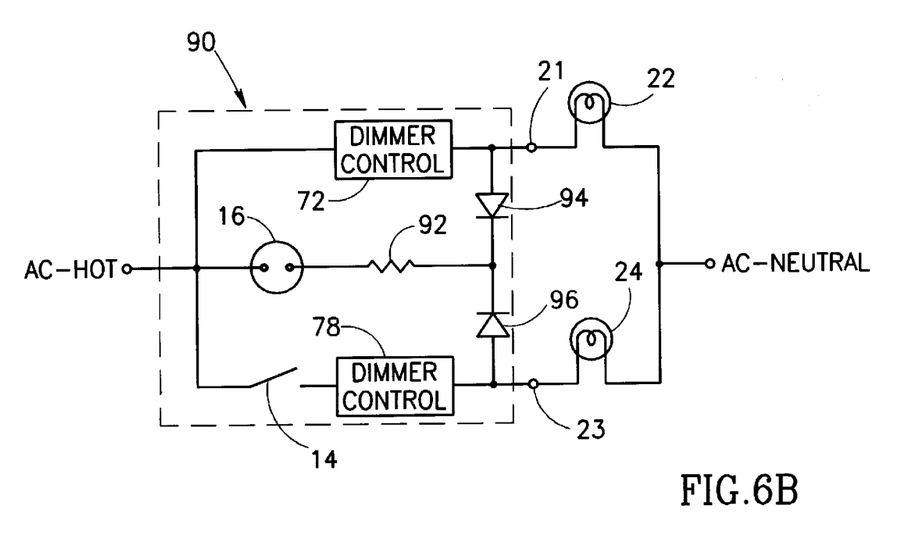
FIG. 6B is a schematic diagram illustrating a fourth embodiment of a dual dimmer control single illuminator circuit with one switch in the closed position.

When both switching devices 12, 14 are in the open state, the neon lamp 16 is lit during every negative half cycle of the AC voltage. In the case where one switching device, i.e., 12, is in the closed state, however, the neon lamp 16 remains lit. A schematic diagram illustrating a fourth embodiment of a dual dimmer control single illuminator circuit with one switch in the closed position is shown in FIG. 6B. The brightness level of the neon lamp 16 remains the same no matter what position the dimmer control 72 is set to. This is due to the single resistor 92 in series with the neon lamp 16. When both switches are open, both diodes conduct current that contribute to lighting the neon lamp 16. When one of the switches is closed, i.e., switch 12, is closed, the position of the dimmer control has no effect on the brightness of the neon lamp 16. Note that the neon lamp 16 is only energized during the negative half cycle of the AC voltage.

If switch 14 is also closed, however, then the brightness level of the neon lamp 16 depends on the brightness level of the dimmer control 78. If both switches 12,14 are in the closed state, the neon lamp 16 may still light if one of the dimmer controls 72, 78 is set to a low enough brightness level. The neon lamp 16 will not light when both switches 12,14 are closed if the brightness level of both dimmer controls 72,78 are set too high, i.e., both dimmer controls 72,78 fire too early in the AC cycle. Accordingly, the brightness of the neon lamp 16 varies with the firing angle of the triac within one of the dimmer controls 72,78 when both switches 12, 14 are closed.

While the invention has been described with respect to a limited number of embodiments, it will be appreciated that many variations, modifications and other applications of the invention may be made.

What is claimed is:

1. A dual electrical control device with a single illuminator to be connected between a source of AC power and a first and second electrical load, comprising:

first and second electrical switching devices each having a line side and a load side, said first and second switching devices settable to a closed or conductive state and an open or non-conductive state, said first and said second switching devices being electrically connected to said AC source via said line side;

illumination means having first and second terminals, said first terminal of said illumination means electrically connected to said AC source and said line sides of said first and second switching devices;

a first diode having an anode and a cathode, said anode of said first diode electrically connected to said load side of said first switching device to form a first load terminal for connection to said first electrical load, said cathode of said first diode electrically connected to said second terminal of said illumination means; and a first load having first and second terminals, said first terminal of said first load electrically connected to said first load terminal and said second terminal of said first load connected to an AC-neutral terminal of said AC source;

a second diode having an anode and a cathode, said anode of said second diode electrically connected to said load side of said switching device to form a second load terminal for connection to said second electrical load, said cathode of said second diode electrically connected to said second terminal of said illumination means; and a second load having first and second terminals, said first terminal of said second load electrically connected to said second load terminal and said second terminal of said second load connected to said AC-neutral terminal of said AC source;

wherein said illumination means is lit when both said first and second switching devices are in the open state, when said first switching device is in the closed state and said second switching device is in the open state or when said first switching device is in the open state and said second switching device is in the closed state.

2. The device according to claim 1, further comprising an impedance electrically in series with said illumination means.

3. The device according to claim 2, wherein said impedance comprises a resistor.

4. The device according to claim 1, further comprising an impedance electrically in series with said first diode.

5. The device according to claim 4, wherein said impedance comprises a resistor.

6. The device according to claim 1, further comprising an impedance electrically in series with said second diode.

7. The device according to claim 6, wherein said impedance comprises a resistor.

8. The device according to claim 1, wherein said illumination means comprises a neon lamp.

9. The device according to claim 1, further comprising first and second dimmer controls electrically in series with said first and said second switching means, respectively.

10. The device according to claim 1, wherein said first and said second electrical loads comprise electrical lighting fixtures.

11. A dual electronic control device with a single illuminator to be connected between a source of AC power and a first and second electrical load comprising:

first and second electrical switching devices each having a line side and a load side, said first and said second switching devices settable to a closed or conductive state and an open or non-conductive state, said first and said second switching devices being electrically connected to said AC source via said line side;

first and second dimmer controllers each having a first terminal and a second terminal, said first terminal of said first and second dimmer controls electrically connected to the load side of said first and second switching devices, respectively;

illumination means having first and second terminals, said first terminal of said illumination means electrically connected to said AC source and said line sides of said first and second switching devices;

a first diode having an anode and a cathode, said anode of said first diode electrically connected to said second terminal of said first dimmer controller to form a first load terminal for connection to said first electrical load, said cathode of said first diode electrically connected to said second terminal of said illumination means;

a first load having first and second terminals, said first terminal of said first load electrically connected to said first load terminal and said second terminal of said first load connected to an AC-neutral terminal of said AC source;

a second diode having an anode and a cathode, said anode of said second diode electrically connected to said second terminal of said second dimmer control to form a second load terminal for connection to said second electrical load, said cathode of said second diode electrically connected to said second terminal of said illumination means; and a second load having first and second terminals, said first terminal of said second load electrically connected to said second load terminal and said second terminal of said second load connected to said AC-neutral terminal of said AC source;

wherein said illumination means is lit when both said first and said second switching devices are in the open state; when said first switching device is in the closed state and said second switching device is in the open state or when said first switching device is in the open state and said second switching device is in the closed state.

12. The device according to claim 11, further comprising an impedance electrically in series with said illumination means.

13. The device according to claim 12, wherein said impedance comprises a resistor.

14. The device according to claim 11, further comprising an impedance electrically in series with said first diode.

15. The device according to claim 14, wherein said impedance comprises a resistor.

16. The device according to claim 11, further comprising an impedance electrically in series with said second diode.

17. The device according to claim 16, wherein said impedance comprises a resistor.

18. The device according to claim 11, wherein said illumination means comprises a neon lamp.

19. The device according to claim 11, wherein said first and said second electrical loads comprise electrical lighting fixtures.

* * * * *